United States Patent [19]
Doerfler et al.

[11] 4,068,900
[45] Jan. 17, 1978

[54] BLEND BACK PROPORTIONING BRAKE CONTROL APPARATUS

[75] Inventors: Roger E. Doerfler, Detroit; Gary A. Willi, Taylor, both of Mich.

[73] Assignee: Kelsey-Hayes Co., Romulus, Mich.

[21] Appl. No.: 711,775

[22] Filed: Aug. 5, 1976

[51] Int. Cl.² .............................................. B60T 8/26
[52] U.S. Cl. ................................... 303/6 C; 188/349; 200/82 D
[58] Field of Search .................. 303/6 C, 6 R, 84 A, 303/84 R; 188/349, 151 A; 200/82 D; 340/52 C

[56] References Cited

U.S. PATENT DOCUMENTS

| | | | |
|---|---|---|---|
| 3,480,333 | 11/1969 | Stelzer | 303/6 C |
| 3,677,605 | 7/1972 | Matsumoto et al. | 303/6 C |
| 3,790,221 | 2/1974 | Fulmer | 303/6 C |
| 3,937,523 | 2/1976 | Ayers, Jr. et al. | 303/6 C |
| 3,945,686 | 3/1976 | Orzel | 188/349 X |

Primary Examiner—Trygve M. Blix
Assistant Examiner—Douglas C. Butler
Attorney, Agent, or Firm—Harness, Dickey & Pierce

[57] ABSTRACT

A dual hydraulic brake system incorporating a dual master cylinder for separately pressurizing the front and rear brakes of a vehicle. A device for varying the proportion of brake pressure applied to the front and rear brakes of a vehicle is positioned between the master cylinder and the front and rear brakes. The device includes a differential area piston for decreasing the proportion of brake pressure delivered to the rear brakes above a first preselected inlet pressure. Positioned within the differential area piston is a second valve assembly which is actuated in response to attainment of a second preselected brake pressure and which blends back the pressure in the rear brake system until it attains the pressure in the front brake system.

11 Claims, 3 Drawing Figures

BLEND BACK PROPORTIONING BRAKE CONTROL APPARATUS

BACKGROUND-SUMMARY OF THE INVENTION

The present invention relates to an apparatus for vehicle hydraulic brake systems, particularly dual hydraulic brake systems having disc-type brakes on the front wheels and drum-type brakes on the rear wheels.

It is known that the proportion of the vehicle's weight that is borne by the front and rear wheels of a vehicle changes as the vehicle is braked. In particular, during the braking operation the weight borne by the front wheels increases while the weight borne by the rear wheels decreases. The change in weight is dependent upon the magnitude of the deceleration of the vehicle and also the weight of the vehicle and the position of the load in it. To compensate for this weight shift, various proportioning devices or valves are known today which are responsive to master cylinder outlet pressures and which serve to limit the brake pressure applied to the rear wheels upon attainment of a predetermined master cylinder outlet pressure.

In vehicular brake systems having dual hydraulic brake systems with disc-type brakes on the front wheels and drum-type brakes on the rear wheels, it is also necessary to have the braking forces and the torques be applied approximately simultaneously to the front and rear wheels. This prevents a dangerous skidding condition. Further, in such vehicular brake systems, the front and rear brakes are designed to reach a point of lock-up at a predetermined pressure ratio. Since disc-type and drum-type brakes have different feed characteristics, the fluid pressure at which the rear brakes will lock up under prolonged braking conditions is considerably greater than the fluid pressure at which the front wheel disc brakes will lock up under the same braking conditions. Thus, it is desirable that a decreasing offset or pressure differential between the front and rear brake pressures be established to achieve equalization of the fluid pressure delivered to the front and rear brakes at a predetermined rate.

Further, with the use of dual hydraulic brake systems in vehicles having radical weight shifts in the laden and unladen conditions, such as light trucks, recreational vehicles, small buses, front wheel drive cars, and other similar vehicles, it is necessary to match the braking pressures in the front and rear wheels to the available road adhesion in both conditions.

It is a general object of the present invention to provide a new, improved proportioning device which is adapted to be inserted between the master cylinder and a rear brake cylinder of a vehicle braking system for controlling the pressure applied to the rear brakes above a first predetermined master cylinder outlet pressure and also having an additional proportioning device incorporated therein for controlling the pressure delivered to the rear brakes above a second predetermined brake fluid inlet pressure, in order to accommodate for differential fade characteristics between the front and rear brakes of a vehicle.

It is another object of the present invention to provide a proportioning device which is particularly suitable for vehicles with radical weight shifts in the laden and unladen conditions in order to make maximum use of available road adhesion in both conditions. It is a further object to provide a device meeting the above-stated conditions which can be substituted in conventional differential area proportioning valves without any additional body machining or other changes in the housing or other parts of the braking system.

It is still another object of the present invention to provide a device for dual master cylinder braking systems which prevents the front disc-type brakes from being energized until the rear drum-type brakes are functioning, thereafter meters the pressure applied to the front brakes and limits the pressure applied to the rear brakes, and also includes means for indicating to the vehicle operator of a failure in either the front or rear brake system.

Other objects, features and advantages of the present invention will become apparent from the following detailed description taken in conjunction with the accompanying drawings.

DESCRIPTION OF THE PREFERRED EMBODIMENTS

Figure 1:
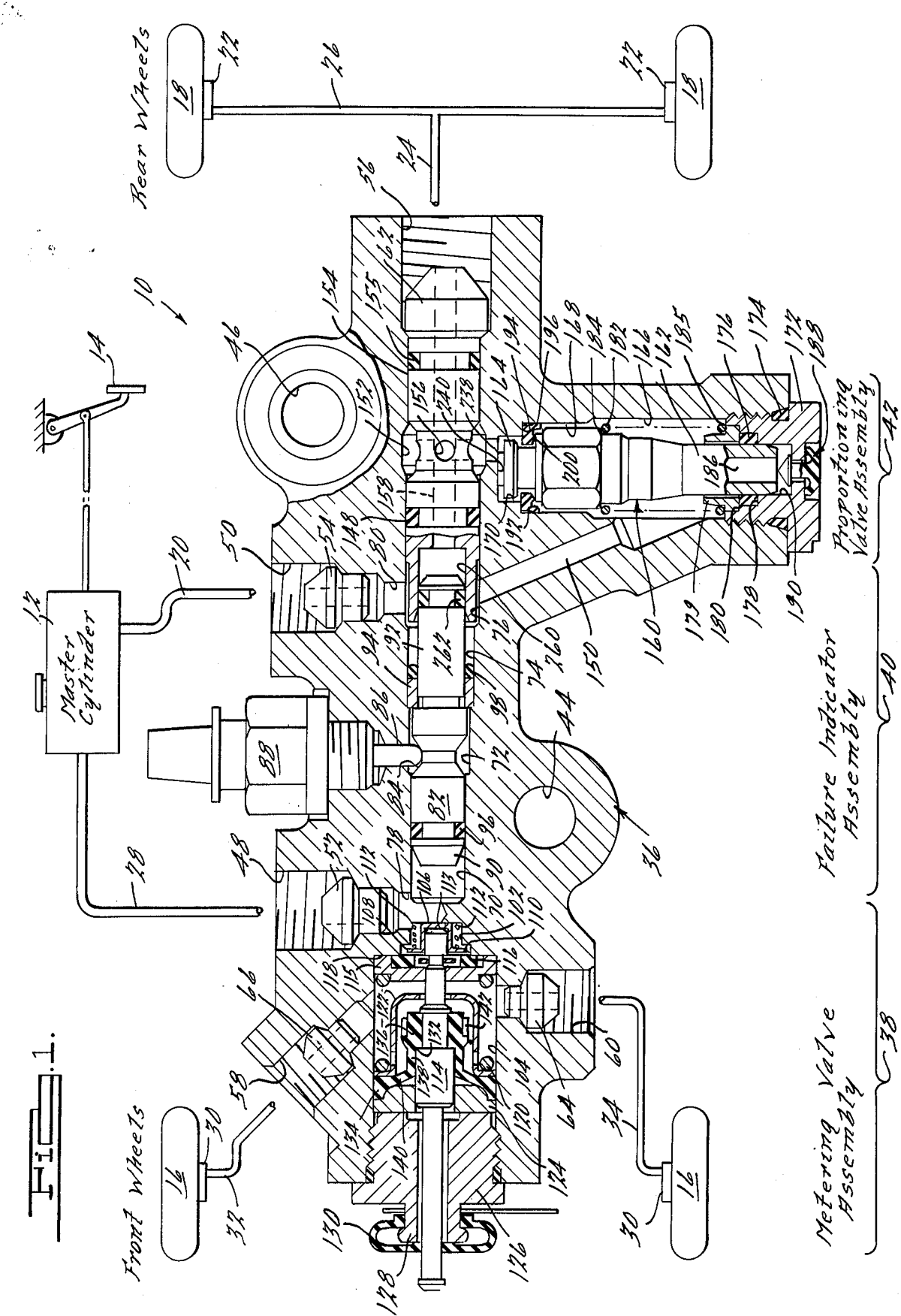
FIG. 1 is a cross-sectional view of an apparatus in accordance with the present invention.

The apparatus 10 of the present invention is adapted to be part of a vehicular braking system as illustrated in FIG. 1. The apparatus 10 is utilized with a braking system which includes a dual master cylinder 12 which is operated by a brake pedal 14 to deliver brake fluid under pressure to the brakes in the front wheels 16 and the rear wheels 18. As to the rear wheels 18, the pressurized fluid is delivered through conduit 20 from the master cylinder 12 to the apparatus 10 and then to a pair of rear brake cylinders 22 via conduits 24 and 26. Fluid under pressure from the master cylinder 12 is also transmitted through a conduit 28 to the apparatus 10 and then to a pair of front brake cylinders 30 via conduits 32 and 34.

As shown in FIG. 1, the present invention 10 includes a housing 36 which generally comprises a metering valve assembly 38, a failure indicator assembly 40, and a proportioning valve assembly 42. Fluid pressure is transmitted from the master cylinder 12 through one side of the failure indicator assembly 40 in housing 36 through the proportioning valve assembly 42 and then to the rear brake cylinders 22. At the same time, fluid pressure from the master cylinder 12 is transmitted to the other side of the failure indicator assembly 40 through the metering valve assembly 38 to the front brake cylinders 30. The housing 36 has a plurality of mounting holes 44 and 46 which are used to securely mount the housing 36 to the vehicle at a conventional position, for example, inside the engine compartment.

The brake device 10 has two inlet openings 48 and 50 communicating with conduits 28 and 20, respectively, supplying pressurized brake fluid from the master cylinder 12. The brake lines 28 and 20 are tightly and securely fastened to the housing 36 in a sealing engagement via any conventional means. For example, as shown in FIG. 1, the inlet openings 48 and 50 have enlarged threaded outer ends adapted to receive threaded nuts (not shown) which are positioned around the conduits 28 and 20. Positioned inside the openings 48 and 50 are tube seats 52 and 54, respectively, over which flared ends (not shown) of conduits 28 and 20 are positioned and securely held in place by the nuts. If desired, any other conventional type of sealing means, such as an O-ring can be utilized in place of or in combination with a tube seat to seal the inlet openings from possible leakage of brake fluid.

The housing 36 also has several outlet openings. Outlet opening 56 is adapted to communicate the pressurized fluid entering inlet opening 50 with conduit 24 and thus in turn with the rear wheels 18. Outlet openings 58 and 60 are adapted to communicate the pressurized fluid passing into and through the housing 36 via inlet openings 48 with conduits 32 and 34, and thus in turn with the front wheels 16. Outlet openings 58 and 60 are sealed in the same manner described above with reference to inlet openings 48 and 50. For this purpose, tube seats 64 and 66 are provided in outlet openings 60 and 58, respectively, and the corresponding conduits 32 and 34 are provided with outwardly flared lower ends. In outlet opening 56, a safety stop 62 is provided to seal opening 56. The stop 62 is part of a spool member 154 and is adapted to provide the same function as a tube seat. The end of conduit 24 is flared to mate with stop 62 and the conduit 24 is secured in place by a threaded nut.

In the event of a failure of either the front or rear brake systems, it is desirable to provide a warning signal to the vehicle operator. This function is carried out by the brake failure indicating assembly 40. The warning assembly 40 is preferably of the type shown and described in U.S. Pat. Nos. 3,480,333 and 3,937,523 (both assigned to the assignee of this application), the disclosures thereof which are incorporated herein by reference.

The failure indicating device 40 provides a warning signal to the operator as soon as one of the brake systems fails and allows the operator to take precautionary measures prior to actual application of the brakes. The device 40 also automatically recenters or resets itself as soon as the pressures in both systems are returned to normal, thus eliminating the costly and time-consuming manual resetting often encountered with other types of warning indicators.

The housing 36 has a generally central longitudinally extending bore 70 having various stepped diameters along its length. In the failure warning assembly 40, the bore 70 increases in diameter in step fashion by means of bore portions 72, 74 and 76. Bore 70 is positioned at one end of the failure indicator assembly 40 and communicates directly with the inlet pressure to the front brake cylinders by means of bore 78 which is a direct extension of inlet opening 48. Bore 76 is positioned on the opposite end of the assembly 40 and communicates with bore 80 which is a direct extension of inlet opening 50. Thus, bores 78 and 70 communicate with the inlet brake pressure being applied to the front brakes in the system and bores 74, 76 and 80 communicate with the brake pressure being applied to the rear brakes.

A shuttle piston (detent member) 82 is slidably located in bore portions 70, 72, 74 and 76. The shuttle piston 82 has an annular groove 84 therein adapted to receive a plunger 86 of an electrical switch 88. Electrical switches which can be utilized for switch 88 are well known and it is not necessary to describe their internal structure and operation. Any such switch, however, should have a spring or other resilient member therein adapted to normally retain the plunger 86 in its fully extended position, as shown in FIG. 1. The switch 88 is connected in turn by means of an electrical circuit (not shown) to a warning indicator, such as a buzzer or light, in the interior of the car near the operator.

When the plunger 86 is fully extended, the switch 88 does not provide any signal to the vehicle operator. Upon movement of the shuttle piston 82 either to the right or left, in response to the failure of either the front or rear brake systems, the plunger 86 is moved upwardly out of the groove 84 and activates the switch 88. When the switch 88 is actuated, an indication is provided to the vehicle operator who then knows that there is a problem in the braking system and can have the matter corrected.

The shuttle member 82 has piston portions 90 and 92 on opposite ends thereof. The diameter of portion 92 is less than the diameter of portion 90 in order to effectuate self-centering of member 82, as described below. The shuttle member 82 is slidably supported by annular bushing 94 which in turn is slidably located in bore 74. The diameter of the bushing 94 is greater than the diameter of piston portion 90. The bushing 94 also extends radially inwardly to rest on shoulder 100 and partially overlap bore portion 72. Bushing 94 also is engageable with the center portion of the shuttle member 82. O-rings 96 and 98 are positioned on opposite ends of member 82 to provide a seal between end portions 90 and 92.

The inlet pressures to the front and rear brakes from the master cylinder are normally substantially equal. Since piston portion 90 is larger in area than piston portion 92, a net force to the right in FIG. 1 is developed. This force is opposed by bushing 94 which by the pressure from the rear brake system is seated on shoulder 100 and against member 82. Thus, shuttle piston member 82 is rigidly held in place and will not move. In the event of failure of the rear brake system, that is, loss of pressure in conduits 20, 24, and/or 26, and thus in bores 74, 76 and 80, the pressure from the front brake system in bore 70 will exceed the pressure in the rear brake system. As a result, piston portion 90 and hence shuttle member 82, as well as bushing 94 and piston portion 92, will be displaced to the right, actuating switch 88 and providing a failure indication to the vehicle operator. In the event of failure of the front brake system, that is, loss of pressure in conduits 28, 32, and/or 34, and thus in bores 70 and 78, the pressure in bores 74 and 76 will exceed the pressure in bore 70. As a result, piston portion 92 and hence shuttle member 82, will be displaced to the left, actuating switch 88 and also providing a failure indication to the vehicle operator.

As previously noted, the failure indicating apparatus will automatically reset upon correction of the failure condition (or upon termination of a transient condition which had caused unwanted actuation). In the event of failure of the rear brake system, the detent member 82, piston portion 92 and bushing 94 are moved to the right. Upon correction of the failure condition and upon the next application of the brake pedal 14, the brake pressures in bore portions 74 and 76, on the one hand, and bore 70, on the other hand, will again be substantially the same. The force on piston member 90 urging the shuttle member 82 to the right will be determined solely by the effect of the area of the piston portion 90. However, the force on the shuttle member 92 urging it to the left will be determined not only by the effect of the area of the piston portion 92, but also by the effect of the area of the bushing 94. The extra force via bushing 94 will cause the detent member 82 to be moved to the left until bushing 94 engages shoulder 100. At that point, member 82 will be returned to its centering position and switch 88 will again be deactuated.

A similar operation occurs upon failure and repair of the front brake system. In the event of such a failure, shuttle member 82, together with piston portion 90, will move to the left, causing switch 88 to be activated. The bushing 94 will remain in its position abutted against shoulder 100. Upon correction of the failure condition and upon the next application of the brake pedal 14, the fluid pressures in bores 70 and 74 will again be substantially the same. The force via piston portion 92 urging the member 82 to the left will be determined solely by the effect of the area of the piston 92 while the force on the shuttle piston 82 urging it to the right will be determined by the effect of the area of the piston portion 90. Since portion 90 is greater in diameter than portion 92 and hence has a greater area exposed to the fluid, member 82 will be moved to the right until it engages the bushing 94. At that point, the member 82 will have been returned to its central position deactuating the switch 88.

Although the failure indicator 40 has been described with a shuttle piston 82 and piston portions 90 and 92 as being part of a one-piece integral unit, it is understood that they can be separate parts. The operation of the assembly 40 in the event of a brake system failure and repair would be exactly the same. Also, it is possible to provide the piston portions 90 and 92 of substantially the same diameter and provide an annular bushing in bore 70 adjacent the left end of member 82 in essentially the same manner as bushing 94 is provided in bore 74. Such an arrangement is described in U.S. Pat. Nos. 3,480,333 and 3,937,523. Again, the operation of the failure indicator assembly 40 would be the same.

The metering valve assembly 38 preferably is of the type shown and described in U.S. Reissue Pat. No. 28,253 to William Stelzer, the disclosure of which is incorporated herein by reference. That patent is assigned to the same assignee as the present application. As noted above and in the subject patent, the metering valve assembly 38 is typically used when the front brakes are disc-type brakes and the rear brakes are drum-type brakes. The metering valve assembly 38 is interposed between the master cylinder 12 and the front brake cylinders 30 and generally retards the delivery of brake pressure to the disc brake cylinders during pedal application until the master cylinder pressure reaches a predetermined value. The predetermined value is selected such that it is essentially the same as or greater than the force at which the rear drum-type brakes begin to be actuated. Hence, the disc brakes will produce a braking torque at the same time, or shortly after, the drum-type brakes and inadvertent application of the disc brakes and thus premature wearing of the disc brake shoes will be prevented.

The inlet opening 48 communicates with the two outlet openings 58 and 60 by means of bores 78, 102 and 104. The metering valve assembly 38 is adapted to control communication of brake fluid pressure between the inlet opening 48 and the outlets 58 and 60.

Positioned in bore 102 is a valve cup or cap 106 which is part of the metering valve assembly 38. The cap 106 is generally cylindrical in cross section and has an outwardly extending flange 108 thereon which is positioned in a slightly enlarged diameter portion 110 of bore 102. A spring 112 is positioned between the flange 108 of the valve cap 106 and the shoulder 113 between bores 102 and 78. The spring 112 maintains the cap 106 at a slight spring pressure on a push rod 114 which also is a part of the metering valve assembly 38. The push rod 114 extends slidably through a valve plate 115 and normally engages the inside of the valve cap 106 and holds it firmly in place adjacent the end of the bore 102. The push rod 114 is of sufficient length so that the flange 108 of the cap 106 will not normally engage with the valve plate 115. Flange 108 does not become engageable with the valve plate 115 until the brake pedal 14 is actuated, and then only under certain pressure conditions as described below.

The valve plate 115 is slidably disposed in bore 104 and has an annular sealing member 116 thereon which is adapted to be sealingly engaged with shoulder 118 between bores 102 and 104. The seal 116 is positioned such that when the cap 106 is displaced slightly such that the flange 108 comes into contact with the seal 116, application of brake pressure is effectively prevented to the front wheel cylinders 30. Spring 120 positioned in bore 104 holds the valve plate 115 tightly against shoulder 118 and thus keeps seal 116 normally engaged in its sealing position.

The push rod 114 is slidably positioned in a central opening of the valve plate 115, as well as central openings in retainer 122, washer 124 and plug 126. The plug 126 is threadedly fastened in the end of housing 36 and seals the end of bore 104. A flexible dust cap or boot 130 surrounds a reduced end 128 of plug 126 and the outer end of the push rod 114. The boot 130 keeps dirt, grease and other foreign matter from gaining access to the interior of the metering valve assembly 38.

A diaphragm 132, formed of molded flexible rubber or other suitable material, is positioned between the washer 124 and retainer 122. The diaphragm 132 has an outer flanged end 134, an inner flanged end 136, an axial section 138 and a radial section 140. The outer flanged end 134 is firmly positioned against the wall of the bore 104 and held in place by the plug 126 and washer 124 at one side and the retainer 122 and spring 120 at the other side. The end 134 of the diaphragm 132 forms a seal in bore 104 preventing the flow of fluid past washer 124. The inner flanged end 136 of diaphragm 132 is radially inwardly extending and is positioned to slightly fit over and grip the push rod 114. End 136 is snugly held in place on the rod 114 by a clamp 142. The intervening axial and radial sections 138 and 140 are somewhat thinner and more flexible than the flanged ends 134 and 136. The diaphragm 132 normally holds the push rod 114 in the position illustrated in FIG. 1 so that the valve cap member 106 is maintained in clearance relation with valve plate 115. In this manner, fluid is allowed to freely flow from inlet 48 to outlets 58 and 60. However, when a prespecified fluid force within the metering valve assembly 38 acts against the diaphragm 132, the radial section 140 will move against the washer 124 and the push rod 114 will move axially within bore 104 whereupon the cap member 106 will move toward and engage with the valve plate 115 by action of the spring 112. When the external force is removed, the resilient diaphragm 132 will return to its normal configuration and the parts will resume the position shown in FIG. 1.

Retainer 122 is provided to hold several of the parts of the metering valve assembly 38 in place during assembly. Also, the retainer 122 has a number of openings of sufficient size therein to allow hydraulic fluid to pass through it and act on the diaphragm 132.

With the various parts of the metering valve assembly 38 in the positions shown in FIG. 1, fluid is allowed to freely pass from the inlet opening 48 through bore 78, around cap member 106 and its flange 108, through the central opening of the seal 116, through the central opening of the valve plate 115 and around the push rod 114, into bore 104, and through outlet openings 58 and 60 to the front wheels. At a slight increase in the level of brake pressure applied in the front brake system, such level being insufficient to actuate the brake cylinders 30, the force will cause the diaphragm 132 to displace the push rod 114 (to the left in FIG. 1) and allow the cap 106 to sealingly engage with the seal 116. With the parts in this position, the metering valve assembly 38 is closed and further fluid communication between the inlet 48 and the outlets 58 and 60 is blocked.

As the master cylinder pressure increases with further pedal pressure, it acts against the valve cap 106 and the valve plate 115, tending to move them. This force is opposed by the spring 120 and by the force exerted on the plate 115 by the small amount of fluid trapped within the bore 104 when the valve cap 106 is seated against the seal 116. The force imposed by the fluid trapped in the bore 104 at this point is comparatively small when compared to the force of the spring 120 and may be neglected. Thus, since the force of the spring 120 is substantially constant, it is overcome at a second predetermined level of master cylinder pressure. At this point, the valve plate 115, valve cap 106 and seal 116 are moved away from shoulder 118, thereby opening the metering valve mechanism 38. The valve plate 115 has a plurality of grooves or passageways (not shown) around its outer periphery so that when the valve assembly 38 is open, full pressure can pass from the inlet 48 around the cap 106, past the seal 116, around the outer periphery of the valve plate 115 into the bore 104, and subsequently into and through the outlets 58 and 60. This is the point of initial activation of the front wheel brake cylinders 30 and is determined by the master cylinder pressure at the inlet 48 required to overcome the force of the spring 120. As mentioned above, the spring 120 is selected such that the force necessary to overcome it is at least equal to or greater than the pressure required to overcome the force of the heavy return springs utilized in the rear wheel drum brakes. Thus, premature energization of the front disc brakes is prevented and a braking torque is not developed at the disc brakes at least until one is developed at the rear drum-type brakes.

When the valve assembly 38 opens as described, the master cylinder pressure, that is, the pressure at the inlet 48, develops a force on the valve cap 106 and valve plate 115 just sufficient to overcome the force of the spring 120. When the valve mechanism 38 opens, fluid enters the bore 104 from the master cylinder 12 and increases the pressure therein. This pressure acts on the valve plate 115 in a direction assisting the spring 120 and thus tends to move the plate 115 back toward the shoulder 118 seating the seal 116 and closing the valve. The valve cap 106 and plate 115 remain in this position when the valve assembly 38 is closed until a further increase in master cylinder pressure is sufficient to overcome the opposing forces and reopen it. This modulating opening and closing continues until the master cylinder pressure reaches a level where it completely overcomes the force of the spring 120 and the pressure of the fluid in the bore 104. At this point, the valve mechanism 38 remains open.

When the brake pedal 14 is released, master cylinder pressure drops whereupon the forces on the valve plate 115 and the spring 120 move the plate 115 in the bore 104 and cause the seal 116 to seat against the shoulder 118. However, fluid pressure within the bore 104 is exerted upon the inside surfaces of the valve cap 106 through the openings around the push rod 114 and cause the cap 106 to move and become unseated from the seal 116. In this manner, full pressure within the bore 104 is relieved back to the master cylinder 12. Thus, when the brake pedal 14 is released, even though the push rod 114 remains in an actuated position as a result of fluid pressure in the bore 104 which acts on the diaphragm 132 holding in its depressed condition, the valve cap 106 can move to open the valve assembly 38 and relieve pressure within the bore 104 and at the front wheel brake cylinders 30. When this pressure is substantially released, the diaphragm 132 returns to its normal molded shape and the push rod 114 moves to once again hold the cap 106 in an open position.

The proportioning valve assembly 42 is positioned in the rear brake system and essentially at right angles to the axis of the central bore 70 of housing 36. The assembly 42 acts to limit and proportion the flow of brake pressure from the master cylinder 12 to the rear brake cylinders 22 under certain prespecified conditions, as discussed below.

Brake pressure from the master cylinder 12 entering inlet 50 via conduit 20 will pass through bore 80 into bore 76. At that point, the fluid is prevented from flowing in either direction along the longitudinal axis of bore 76 due to sealing O-rings 98 and 148 and thus is directed through angled passageway 150. From passageway 150, the fluid passes through and is acted upon by proportioning valve assembly 42 and thereafter returns to a chamber 152 in longitudinal bore 76 downstream of seal 148. From chamber 152, the fluid is directed into a spool member 154 through a plurality of holes or apertures 156 into a central channel 158 in member 154. Channel 158 is in direct communication with outlet 56 where the fluid is transmitted via conduits 24 and 26 to the rear wheel brake cylinders 22.

The proportioning piston 160 of the proportioning valve assembly 42 generally comprises a plunger body 162 and a plunger head 164. The plunger head 164 is threadedly and securely fastened to the plunger body 162 and thus these two piston portions move and operate together as one unit. The proportioning piston 160 is centrally located in a longitudinal bore 166 which has two reduced diameter end portions 168 and 170 at its upper end. Passageway 150 is in direct communication with bore 166. At the lower end of bore 166 in housing 36, an end plug 172 is positioned. The end plug 172 is threadedly secured in bore 166 and the joint between plug 172 and bore 166 is sealed by O-ring 174. The piston 160 is slidingly received in the end plug 172. Annular sealing ring 176 is positioned in recess 178 in plug 172 and seals the lower end of the piston 160 preventing fluid in bore 166 from reaching it. The plunger body 162 of piston 160 is slidingly positioned within a bushing 179 which is situated in a recess 180 adjacent recess 178 and seal 176. A spring 182 is positioned around the plunger body 162 and abuts at one end against shoulder 184 on the plunger body 162 and at the other end on bushing 179 and the upper end 185 of plug 172. Central passageway 186 is provided in the piston 160. The end plug 172 has a vent 188 at its lower end which keeps the central bore 190 of the end plug 172 at atmospheric pressure. In this manner, the lower end of piston 160 and its central passageway 186 are also exposed to and maintained at atmospheric pressure.

Valve 192 is situated in bore 168 and is positioned against shoulder 194 formed between bores 168 and 170. As better shown in FIG. 2, valve member 192 has a depending lip 196 at its lower end which, in the free state of the valve member 192, is inclined axially downwardly and radially outwardly. When the valve 192 is fitted in bore 168, the lip 196 is deflected slightly by the engagement of its outer periphery with the wall of the bore 168. This prevents the outward flow of fluid from the bores 166 and 168 around the lip 196 into bore 170. The outer periphery of the valve member 192 above the lip 196 is provided with a plurality of circumferentially spaced axially extending ribs 198 which contact the wall of the bore 168 above the lip 196. The ribs 198 form a plurality of passageways which are of sufficient size to allow fluid to flow through them. The sealing member 192 also has a plurality of spaced nubs or bosses 200 projecting downwardly from the lower side thereof. When the proportioning valve assembly 42 is in the position shown in FIGS. 1 and 2, that is, when the brake pedal 14 is not depressed and the rear brake system is not activated, the nubs 200 are in engagement with the upper end 201 of the plunger body 162. The nubs 200 provide a plurality of passageways between them so that brake fluid can freely flow from bores 166 and 168 around the plunger body 162, around the inside surfaces of the seal 192 (through the passageways between the nubs 200), and into and through bore 170. The sealing member 192 extends radially inwardly in bore 168 and is adapted to sealingly engage with the plunger head 164 when the proportioning piston 160 moves downwardly during operation of the rear brake system, as described below.

As stated earlier, the outer surface of the sealing member 192 has a plurality of angular spaced ribs and passageways thereon to provide spaces for the flow of fluid. As a result, when the plunger head 164 is in sealing engagement with seal 192, fluid pressure at the outlet of the proportioning valve assembly 42, that is, in bore 170, can gain access to the ribs 198 and passageways. Thus, if the fluid pressure in bore 170 is higher than the fluid pressure in bore 168 after the valve is closed, the outlet pressure will force the lip 196 radially inwardly for the reverse flow of fluid from the bore 170 to the bore 168 around the valve member 192. The manner in which a similar valve and proportioning piston operate is described in detail in U.S. Pat. No. 3,423,936, assigned to the assignee of the present application.

A plurality of openings 202 are positioned on the plunger head 164 below the point at which it seals with the sealing member 192 and above the point where the plunger head is threadedly engaged with plunger body 162. The openings 202 allow the inner chamber of the proportioning piston 160, at least at the upper end thereof, to be maintained at the same inlet pressure that exists in chamber 166.

Central bore 186 in the proportioning piston 160 has portions of increased diameter 204 and 206 along its length. Positioned within bore 204 and abuttingly received on shoulder 208 is a cup-shaped cylinder 210. Cylinder 210 has an internal bore 214 with a bottom surface 215. A movable piston member 212 is positioned inside cylinder 210 and is slidably received in a bearing 218. O-ring 216 provides a seal in bore 214 between piston 212 and cylinder 210. The bearing 218 is positioned in bore 204 and acts as a support for O-ring 220 which seals the piston 212 from bore 204.

A movable poppet member 222 is also a part of piston 160 and is centrally located in bores 204 and 206. A nut 224 is threadingly secured to poppet 222 and functions as a retainer for one end of a spring 226. The other end of spring 226 rests on a washer (retainer) 228 positioned in bore 230 in the plunger head 164. The retainer 228 also holds in place an annular sealing member 232 at the upper end of plunger head 164. The upper end of the poppet member 222 has a flange 234 which cooperates with seal 232 to form a valve mechanism. The seal 232 is adapted to sealingly engage with flange 234 and thus keep the poppet valve mechanism closed until a certain prespecified pressure condition exists in the rear brake system of the vehicle. Except when such condition exists, the parts of the poppet valve mechanism are in the positions shown in FIG. 2. Poppet member 222 also has an additional head or flange 236 adjacent flange 234 which rests in a recess in cylindrical member 238 on the top of the plunger head 164. The member 238 is slotted so that when the piston 160 rests against the shoulder or upper surface 240 of bore 170, fluid can pass freely into chamber 152.

The inclined shoulder 208 between bores 186 and 204 has a spiral groove 209 along its surface allowing atmospheric pressure which exists in chamber 186 to also bear on part of the piston 212. In this regard, a clearance on the order of a few thousandths of an inch is provided between cylinder 210 and bore 204, and between the end 241 of cylinder 210 and bearing-support 218. It is also possible, of course, to provide ribs or grooves along end 241 and surface 215 of cylinder 210 for the same purpose. In this manner, chamber 242 and the side of O-ring 216 adjacent chamber 242 are maintained at atmospheric pressure.

In a similar manner, sufficient clearance is provided between the nut 224 and the internal surface of plunger head 164, between the end 243 of piston 212 and nut 224, between the end 244 of poppet member 222 and surface 245 of cylinder 212, and between the end 246 of piston 212 and the surface 215 of bore 214 in cylinder 210. It is also possible, of course, to provide slots or grooves in the respective parts to allow the flow of fluid therethrough. Due to the clearance spaces and/or passageways around piston 212, chamber 248 is maintained at the same pressure that exists in bore 166, that is, the master cylinder inlet pressure to the rear brake system.

All of the various parts of the proportioning valve assembly 42 are metal except for the various sealing members which, of course, are made of rubber or a similar material. Preferably, all of the parts are anodized aluminum except for the poppet member 222, nut 224 and retainer 228 which are steel, and the bearing 218 which is brass.

The proportioning valve assembly 42 normally provides an open fluid path between the inlet 50 and the outlet 56 until the fluid pressure delivered to the housing 36 from the master cylinder 12 reaches a predetermined level. At that time, the valve (plunger) head 164 will close against the valve member 192. The level of pressure at which this occurs is dependent upon the force of the spring 182 compared to the effective areas of the piston 160 acted upon by the pressure in the chamber 166 and the pressure in the chamber 152. During the lower ranges of applied brake effort, the pressures acting on the piston 160 produce a downward force on it which is insufficient to overcome the force of the spring 182. However, as the pressures increase, the head 164 will close against member 192. After the valve thus closes, the fluid pressure in the chamber 166 will be increased by the master cylinder 12, and the increased level of fluid pressure will act against the piston 160 in a manner so as to produce an upwardly directed force on it assisting the spring 182 and tending to reopen or move the head 164 away from the valve member 192 to deliver at least a portion of this increased fluid pressure to the chamber 152 and hence to the rear brakes to the associated vehicle. The piston 160 will continue to modulate and thus proportion the flow of fluid to the rear brakes of the vehicle as the master cylinder pressure continues to increase (until a second predetermined pressure level is reached) and the ratio of the pressures is determined by the relationship of the areas on the piston 160 which are exposed to the fluid pressures in the chamber 166 (and chamber 168) on the one hand and the chamber 170 (associated with chamber 152) on the other hand.

Figure 3:
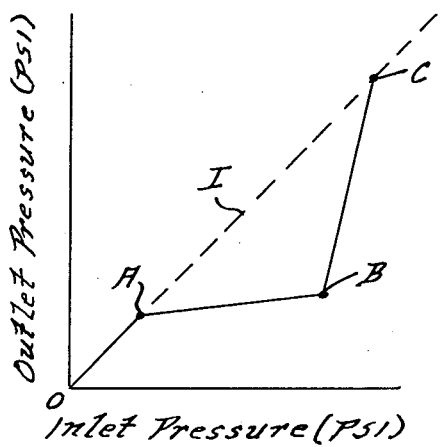
FIG. 3 is a graph illustrating the proportioning of the brake pressure to the wheels of the vehicle provided with a device similar to that shown in FIGS. 1 and 2.

With reference to FIG. 3, the axis of the abscissa indicates inlet and front wheel cylinder pressure, while the axis of the ordinate indicates outlet and rear wheel cylinder pressure. With the brakes released, pressure will be at zero (Point O), and upon the generation of braking pressure due to depression of the pedal 14 and actuation of the master cylinder 12, pressure increases occur equally in the front and rear wheel at a 1:1 ratio, as indicated by the line I, up to the Point A, at which time the proportioning valve assembly 42 first closes. This first preselected pressure level, also called the "first split point", is generally calculated to be the point at which the associated vehicle will start to skid if the pressure to the rear brakes is maintained at the same level of master cylinder pressure. As discussed above, Point A represents the moment at which the force of spring 182 is first overcome and the proportioning valve closes.

From Point A to Point B in FIG. 3, the relationship between the front and rear wheel cylinder pressures changes progressively, as indicated by the line A-B in FIG. 3. It will be noted that the rate of increase in pressure in the front wheel cylinders is substantially greater than the rate of increase in pressure in the rear wheel cylinders. At this stage, the proportioning valve assembly 42 modulates in an open and closed manner, also as discussed above.

At a second preselected point, also called the "second split point" for the proportioning valve assembly 42, the plunger head 164 will remain seated against member 192 and brake fluid will be prevented from flowing through the valve formed by plunger head 164 and seal 192. This is Point B in FIG. 3. It is also at this point that the pressures acting on the poppet member 222 and its co-operating operating components will cause the poppet valve assembly to begin to operate and blend back the brake pressure applied to the rear wheels until it attains the value of the pressure being applied to the front wheels. This is represented by line B-C in FIG. 3.

The present invention matches the vehicle to available road adhesion in both the laden and unladen conditions. Point B, which is the "second split point", is also the incipient skid condition for a dry road at an unladen condition for the vehicle. The blend back point, that is, Point C in FIG. 3, is the incipient skid condition for a dry road at a fully laden condition.

Figure 2:
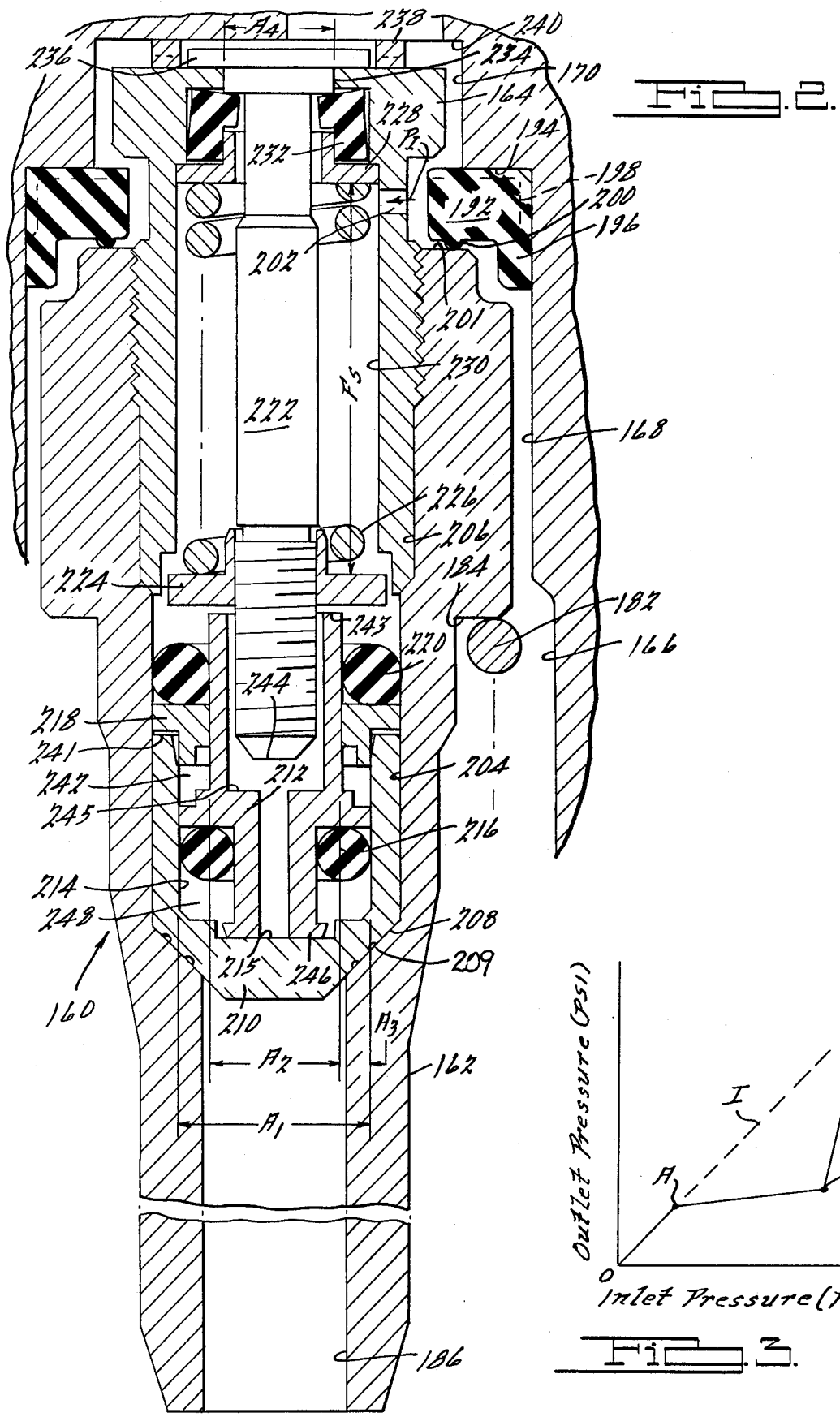
FIG. 2 is an enlarged fragmentary view of the proportioning device of the present invention.

In the operation of the poppet valve, the flange 234 is normally held in sealing engagement with seal 232 by the force $F_S$ of spring 226. The functional areas in operation of this valve are areas $A_1$, $A_2$, $A_3$, and $A_4$, which are shown in FIG. 2. $A_1$ is the cross-sectional area in the bore 214 (and also the area created by the outer circumference of the seal 216). $A_2$ is the area created by the outer diameter of cylinder 212 at bushing 218 (and also is that created by the inner circumference of seal 220). $A_3$ is the net area exposed to the inlet pressure and equals $A_1$ minus $A_2$. $A_3$ essentially looks at atmospheric pressure. $A_4$ is effective area on the poppet member 222 which is exposed to the outlet pressure, that is, the proportioned pressure $P_{PR}$.

The force developed across the area $A_4$ is defined by the following equation:

$$F = (P_I - P_{PR}) A_4 \tag{1}$$

where $P_I$ is the inlet pressure. Also, the output of the proportioning valve assembly 42 above the first split point can be defined by the following equation:

$$P_{PR} = [P_S + P_R(P_I - P_S)] \tag{2}$$

where $P_S$ is the pressure at the split point which is known for the proportioning valve, and $P_R$ is the proportioning ratio which is also known for the valve. Substituting Equation (2) into Equation (1), a general equation is developed for determination of the second split point:

$$F = [P_S + P_R(P_I - P_S)] A_4 \tag{3}$$

There also is an additional force developed by the inlet pressure $P_I$ reacting against the net area $A_3$ which looks at atmosphere. This force is expressed by the following equation:

$$F = P_I A_3 \tag{4}$$

The forces developed in the first equation, Equation (1), and the last equation, Equation (4), are additive, tending to open the poppet valve against the force $F_S$ of spring 226. When the sum of these forces come into equilibrium, the second split point is achieved. This is defined by the equation:

$$F_S = P_I A_3 + (P_I - P_{PR}) A_4 \tag{5}$$

As pressure bypasses the sealing engagement of the proportioning valve seat, that is, the valve formed by the plunger head 164 and sealing member 192, Equation (2) is no longer valid and further increases of inlet pressure $P_I$ will cause the proportioned pressure $P_{PR}$ to approach $P_I$. The force in Equation (5) generated by $P_I A_3$ will thus increase while the force generated by $(P_I - P_{PR}) A_4$ will decrease. The sum of the two forces in Equation (5) between the second split point and the blend back point will always be in equilibrium with the force of the spring $F_S$. The poppet member 222 will-result in a fluid modulation of the brake pressure from Point B to Point C. When the inlet pressure $P_I$ becomes the same as the proportion pressure $P_{PR}$, Equation (5) is no longer valid and the poppet valve forces become out of eqilibrium forcing the poppet valve to remain open and causing blend back (Point C). The condition at blend back is defined by the following equation:

$$F_S = P_I A_3 \tag{6}$$

Once blend back is achieved, all flow through the proportioning valve assembly 42 will be through the poppet valve which will remain in its open condition. Thus, the functions of the proportioning valve assembly 42 will be circumvented and the braking pressures applied to the front and rear brakes will again be at a 1:1 ratio.

In the event of failure of pressure in the front brake system, it is preferable not to apportion or limit the flow of brake pressure to the rear wheels in any manner. Thus, it is preferable to provide a bypass assembly of some type in the rear brake system which will take effect in the event of a front brake pressure failure.

Spool member 154 provided in longitudinal central bore 76 is part of the bypass mechanism. As mentioned earlier, stop 62 is formed at one end of spool member 154 and acts as a tube seat to seal outlet 56. A bore 260 is provided in the end of the spool member 154 opposite stop 62. The bore 260 is adapted to receive the end of portion 92 of shuttle piston 82. The end portion 92 is sealingly engaged in bore 260 by means of O-ring 262. The bore 260 is in direct communication with passageway 158 in the center of spool member 154 which in turn is in direct communication with outlet 56 and the rear brake cylinders 22. Also, O-ring 155 is provided on spool member 154 and seals it along the right hand end of bore 76 and thus prevents brake fluid from leaking around stop 62 and out of the housing 36.

During normal operation of the brake valve assembly 10, the shuttle piston 82 and spool member 154 are in the position shown in FIG. 1, that is, the end portion 92 is positioned in bore 260 effectively preventing passage of brake fluid into bore 260 from bore 76. When the parts are arranged in this manner, all of the fluid pressure being applied to the rear wheels has to flow through passage 150 where it is acted upon by proportioning valve assembly 42. From the assembly 42, the fluid enters chamber 152, passes through openings 156 into passageway 158, and passes out of housing 36 via outlet 56. In the event of failure in the front brake system, however, the shuttle piston 82 will move towards the metering valve assembly 38 (to the left in FIG. 1) as described earlier, and the end portion 92 will be moved out of bore 260 thus breaking the seal formed by O-ring 262. This will allow brake pressure to flow directly from bore 76 into bore 260 and through passage 158 to the rear brake cylinders 22. Of course, when normal pressure is restored to the front brake system, the shuttle 82 will return to its centered position and the end portion 92 will reestablish its sealing engagement with bore 260 closing the bypass valve.

While it is apparent that the preferred embodiments illustrated and described herein are well calculated to fulfill the objects above stated, it will be appreciated and understood that the present invention is susceptible to modification, variation and change without departing from the scope of the invention as defined by the following claims.

We claim:

1. A pressure proportioning valve for modulating the fluid pressure applied to a brake cylinder of a vehicular hydraulic brake system, such proportioning valve comprising a housing, an inlet, an outlet, and a chamber providing communication between said inlet and said outlet, a first pressure responsive means disposed in said chamber and having a valve head, a first valve member adapted to cooperate with said valve head for restricting the flow of fluid from said inlet to said outlet above a first predetermined pressure level and below a second predetermined pressure level in said brake system, a first spring for biasing the first pressure responsive member to a position permitting flow of fluid from said inlet to said outlet, a second pressure responsive means positioned within said first pressure responsive means and having a valve head, a second valve member adapted to cooperate with said valve head of said second pressure responsive means to modulate the flow of fluid from said inlet to said outlet above said second predetermined pressure level in said brake system, said second pressure responsive means having a first area effectively exposed to atmospheric pressure, and a second area exposed to the difference between said inlet pressure and said outlet pressure, said atmospheric pressure producing a force on said first area in a direction to open said second valve member, said difference in inlet and outlet pressures producing a force on said second area in a direction to open said second valve member, and a second spring for biasing the second pressure responsive member in a direction to close said second valve and prevent flow of fluid from said inlet to said outlet.

2. A device for a dual brake system including a master cylinder and front and rear brake actuators, said device being located in said system between said master cylinder and said rear brake actuator and including
    a housing having a fluid inlet adapted to receive fluid from said master cylinder, a fluid outlet through which fluid is adapted to be displaced to said rear brake actuator, and a chamber providing communication between said inlet and said outlet,
    first valve means in said chamber actuable in response to fluid pressure at said inlet above a first predetermined pressure and below a second predetermined pressure for decreasing the transmission of fluid pressure from said outlet,
    second valve means different from said first valve means and having a first area exposed to inlet fluid pressure and a second area different from said first area exposed to the difference between said fluid pressure at said fluid inlet and said fluid outlet, said inlet pressure on said first area producing a first force in a direction to open said second valve means when said fluid pressure at said inlet is above said second predetermined pressure, the fluid pressure differential between said inlet and outlet pressures on said second area producing a second force biasing said second valve means toward its open position when said fluid pressure at said inlet is above said second predetermined pressure, and
    means for resiliently biasing said second valve means to its closed position, said first force and said second force being additive in opposition to the biasing force of said resilient means,
    said second valve means being actuable when said fluid pressure at said inlet is above said second predetermined pressure to provide a direct flow path circumventing said first valve means and permitting fluid to flow at a controlled second rate from said inlet to said outlet, said second valve means disposed within said first valve means and movable longitudinally therein.

3. The invention as set forth in claim 2 wherein said first valve means comprises a proportioning valve.

4. The invention as set forth in claim 2 wherein said first valve means has a first total area exposed to fluid pressure at said inlet and a second total area exposed to fluid pressure at said outlet, and wherein the ratio of said first and second total areas is established so as to provide movement of said valve means in response to fluid pressure at said inlet.

5. The invention as set forth in claim 4 wherein said second total area is greater than said first total area of said first valve means.

6. A device for a dual brake system including a master cylinder and front and rear brake actuators, said device being located in said system between said master cylinder and said rear brake actuator and including:
- a housing having a fluid inlet adapted to receive fluid from said master cylinder and a fluid outlet through which fluid is adapted to be displaced to said rear brake actuator,
- a first modulating valve assembly having an inlet communicable with said fluid inlet and an outlet communicable with said fluid outlet,
- said first valve assembly being adapted for movement in response to fluid pressure at said fluid inlet for decreasing the transmission of fluid pressure from said fluid inlet to said fluid outlet,
- a second modulating valve assembly having a valve member with a first area exposed to atmospheric pressure and providing a first force biasing said second valve assembly towards its open position, and a second area exposed to the fluid pressure differential between said inlet and outlet fluid pressures and providing a second force biasing said second valve assembly toward its open position,
- resilient means biasing said second valve assembly towards its closed position,
- means defining a first flow path from said fluid inlet to the inlet of said first valve assembly and from the outlet of said first valve assembly to said fluid outlet,
- means defining a second flow path from said fluid inlet to the inlet of said second valve assembly and from the outlet of said second valve assembly to said fluid outlet, said second flow path including at least a part of said first valve assembly,
- said valve member of said second valve assembly actuable in response to a predetermined fluid pressure differential between said inlet and outlet of said first valve assembly to provide a second flow path different from said first flow path for modulating the transmission of fluid at a controlled rate from said fluid inlet to said fluid outlet.

7. The invention as set forth in claim 6 further comprising bypass means for sensing a predetermined pressure condition in an ancillary brake system for providing a direct flow path from said fluid inlet to said fluid outlet and bypassing said first and second valve assemblies.

8. The invention as set forth in claim 6 wherein said first modulating valve assembly includes differential area means adapted for movement in response to fluid pressure at said fluid inlet for decreasing the transmission of fluid pressure from said fluid inlet to said fluid outlet, and which includes a second resilient means for applying a force to said differential area means for preventing movement of said differential area means and consequent decreasing the transmission of fluid pressure thereby below a first predetermined fluid level at said fluid inlet, said second resilient means yielding to allow movement of said differential area means to decrease the transmission of fluid pressure from said fluid inlet to said fluid outlet above said first predetermined fluid pressure level.

9. The invention as set forth in claim 6 wherein said housing is formed with a bore, wherein said fluid inlet is communicable with one portion of said bore and said fluid outlet is communicable with another portion of said bore, wherein said first and second valve assemblies are disposed in said bore and are movable longitudinally therein to open and close said second flow path.

10. The invention as defined in claim 6 further comprising failure indicating means for providing a signal in response to failure of either the front or rear brake systems.

11. The apparatus as defined in claim 10 wherein the failure indicating means comprises a shuttle piston means responsive to hydraulic pressure in both the front and rear brake systems and normally being in a first condition in response to the pressures in both systems being approximately the same and being actuable to a second condition in response to the pressure in either system being significantly greater than the pressure in the other system and remaining in said second condition even after deactuation of the vehicle brake system, signal means for providing said signal in response to said shuttle piston means being actuated to said second condition, and reset means for automatically resetting said shuttle piston means from said second condition to said first condition in response to actuation of the vehicle hydraulic brake system and the pressure in both systems returning to normal.

* * * * *